United States Patent Office 3,335,773
Patented Aug. 15, 1967

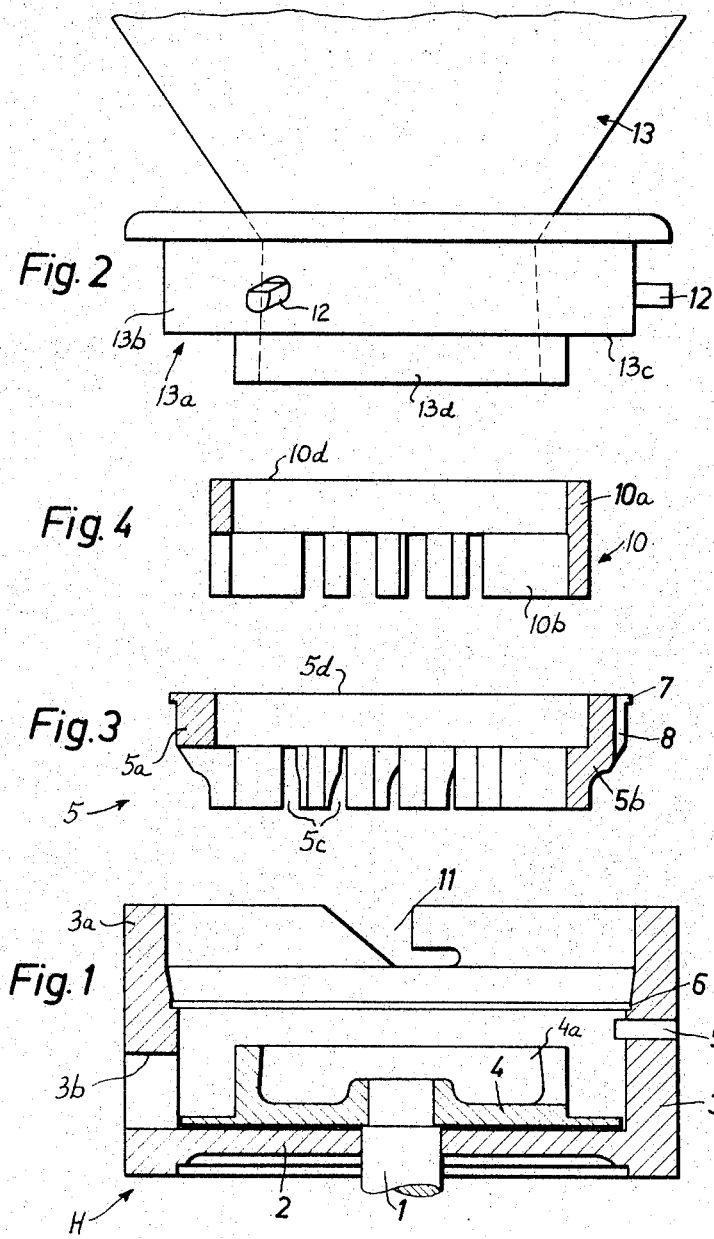

3,335,773
APPARATUS FOR COMMINUTING MEAT OR THE LIKE
Fritz Otto, Hameln (Weser), Germany, assignor to A. Stephan & Soehne, Hameln, Germany
Filed Sept. 23, 1965, Ser. No. 489,658
Claims priority, application Germany, Sept. 25, 1964, St 17,761
12 Claims. (Cl. 146—192)

The present invention relates to comminuting apparatus in general, and more particularly to improvements in a machine for finely comminuting raw or cooked meat and similar foodstuffs. Still more particularly, the invention relates to improvements in comminuting machines of the class disclosed, for example, in the copending application Serial No. 240,347 of Josef Hermes, filed November 27, 1962, now Patent No. 3,230,991, and of the same assignee as the instant application.

In heretofore known grinding or comminuting machines for meat or the like, the funnel which feeds material to the cutting chamber is bolted or screwed onto the housing of the comminuting machine, and the stationary cutting member is provided with threads which mesh with complementary threads machined into the housing. It was also proposed to use one or more screws in order to provide a detachable connection between the housing and the stationary cutting member. A serious drawback of such prior machines is that the cutting of threads on cooperating parts involves substantial expenditures and adds considerably to the initial cost of the machine. Also, removal of stationary cutting members must be carried out by resorting to very large and specially configurated wrenches which are likely to be misplaced when not in actual use. It is well known that a machine which is used for grinding or comminuting of meat or the like must be cleaned after every use or after each shift. Now, a negligent operator might decide to clean the machine without removing the stationary cutting member because such removal involves too much effort and/or the use of a tool which might not be ready at hand. This, of course, invariably results in less than satisfactory cleaning so that the machine might not meet the requirements of authorities which supervise the sanitary conditions in a meat processing or food processing plant.

Accordingly, it is an important object of the present invention to provide a very simple, compact and easy to assemble machine for comminuting meat or the like and to construct the component parts of the machine in such a way that they may be readily assembled or taken apart without resorting to any tools and with a minimum of effort.

Another object of the invention is to provide a machine of the just outlined characteristics wherein the stationary cutting member or members and the housing may be assembled in a novel and time saving manner.

A further object of the invention is to provide a machine for comminuting raw or cooked meat or similar food-stuffs and to construct the machine in such a way that the material admitting or feeding member may perform at least one additional function and can be rapidly and conveniently assembled with or detached from the remainder of the machine.

An additional object of the instant invention is to provide a cutting or comminuting machine wherein a plurality of stationary cutting members may be assembled with each other and with the housing in a novel and space-saving manner.

A further object of the invention is to provide a machine of the above outlined characteristics which may be assembled or taken apart within a matter of seconds so that the cleaning of each of its component parts presents no problems.

Another object of the invention is to provide a comminuting machine wherein the connections between various components need not and preferably do not include threads so that the machine may be produced at a relatively low cost and is less likely to have hard-to reach dead corners, narrow grooves and similar collectors of contaminable material.

Briefly stated, one feature of the present invention resides in the provision of a machine for comminuting raw or cooked meat and similar materials, preferably after the material has undergone a preliminary or coarse grinding or comminuting treatment. The machine comprises a housing having a transverse wall and a first annular wall extending from one side (preferably upwardly) of the transverse wall, a drive shaft extending through the transverse wall, a rotary cutting member secured to the shaft in the interior of the housing, and a stationary cutting member having a second annular wall received in the first annular wall. One of the two annular walls has an axially extending groove adjacent to the other annular wall and the other annular wall has a projection extending into the groove to hold the second annular wall against rotation but to permit withdrawal of the stationary cutting member from the housing in the axial direction of the first annular wall.

The first annular wall comprises a first annular portion which extends beyond the stationary cutting member, and the machine further comprises a funnel which feeds material into the stationary cutting member and comprises a second annular portion which is received in the annular portion of the first annular wall. The two annular portions are detachably coupled to each other by at least one bayonet lock including a bayonet slot provided in one of the annular portions and a bayonet pin provided on the other annular portion. When the funnel is properly attached to the housing, it prevents axial movements of the stationary cutting member.

When the machine is to perform a particularly fine cutting or comminuting operation, it may comprise a second stationary cutting member having an annulus of teeth which extend into the gaps provided between the teeth on the first mentioned stationary cutting member. The two annuli of teeth surround a further annulus of teeth on the rotary cutting member so that the material which is fed into the stationary cutting members is comminuted by the teeth of the rotary cutting member and is forced through the clearances between the teeth of the stationary cutting members to issue from one or more outlets which are provided in the housing and are outwardly adjacent to the stationary cutting members.

The novel features which are considered as characteristic of the invention are set forth in particular in the appended claims. The improved comminuting machine itself, however, both as to its construction, its mode of operation, and the mode of assembling or dismantling the same, will be best understood upon perusal of the following detailed description of a specific embodiment with reference to the accompanying drawings, in which:

FIG. 1 is an axial section through the housing and the rotary cutting member of a comminuting machine which embodies the invention;

FIG. 2 is a fragmentary side elevational view of a material feeding funnel which may be coupled to the housing of FIG. 1 in a novel manner;

FIG. 3 is a axial section through a first stationary cutting member; and

FIG. 4 is an axial section through a second stationary cutting member.

Referring first to FIG. 1, there is shown a portion of a comminuting machine which comprises a housing H having a transverse wall 2 which constitutes the bottom wall of the housing and an annular wall 3 extending upwardly from the upper side of the bottom wall 2. The bottom wall is traversed by a coaxial vertical drive shaft 1 which extends into the interior of the housing H and is non-rotatably secured to a rotary cutting member 4 having an upwardly extending annulus of teeth 4a. The annular wall 3 is formed with an internal annular shoulder 6 and that annular portion 3a thereof which extends beyond the shoulder 6 is formed with three equidistant bayonet slots 11 (only one shown in FIG. 1).

The machine further comprises a first stationary cutting member 5 which is shown in FIG. 3 and comprises an annular wall 5a and an annulus of downwardly extending teeth 5b defining between themselves a plurality of gaps 5c. The teeth 5b are offset radially inwardly with reference to the annular wall 5a and, when the cutting member 5 is fully inserted into the housing H, such teeth surround the annulus of teeth 4a on the rotary cutting member 4. The annular wall 5a has a radially outwardly extending annular flange or collar 7 which comes to rest against the annular shoulder 6 to thereby hold the cutting member 5 against further axial movement into the interior of the housing H. The means for preventing rotation of the cutting member 5 comprises an axially extending groove 8 which is provided in the external surface of the annular wall 5a and a projection or stud 9 which extends radially inwardly from the annular wall 3 and into the groove 8. The groove 8 may but need not extend through the flange 7.

The machine also comprises a second stationary cutting member 10 which is illustrated in FIG. 4 and comprises an annular wall 10a and an annulus of teeth 10b. The cutting member 10 may be fully inserted into the cutting member 5 whereby the teeth 10b enter into the gaps 5c between the teeth 5b. In response to proper insertion of the cutting members 5, 10 into the housing H, the upper end faces 5d, 10d of the annular walls 5a, 10a are preferably located in a common plane which is distant from the transversely extending bottom wall 2. The cutting member 10 is automatically held against rotation because its teeth 10b alternate with the teeth 5b of the cutting member 5 and because the latter is held against rotation by the groove-and-slot connection 8, 9. It is clear that, when the upper end of the housing H is open, the operator can immediately withdrawn the cutting members 5 and 10 from the interior of the annular wall 3 simply by moving the cutting member 5 axially and away from the bottom wall 2.

The means for feeding material to be comminuted into the interior of the cutting members 5, 10 (i.e., onto the top face of the rotary cutting member 4) comprises a specially constructed funnel 13 the lower part 13a of which constitutes a clamping means for holding the cutting members 5, 10 against axial movement with reference to the housing H. The clamping means 13a comprises an annular portion 13b which may be inserted into the annular portion 3a of the stationary annular wall 3 and is provided with three equidistance bayonet pins 12 each of which may enter one of the bayonet slots 11. When the pins 12 are fully inserted into the respective slots 11, the lower end face 13c of the annular portion 13b bears against the top end faces 5d, 10d and thus prevents axial movements of the cutting members 5 and 10.

It is clear that the position of the projection 9 and groove 8 may be reversed, and the same holds true for the slots 11 and pins 12. When the machine is fully assembled, the lowermost portion 13d of the funnel 13 extends into the annular wall 10a of the cutting member 10.

In order to dismantle the machine, the operator simply turns the funnel 13 with reference to the housing H so that the pins 12 are withdrawn from the respective bayonet slots 11. A small angular displacement suffices to uncouple the funnel 13 whereupon the latter may be moved vertically upwardly to withdraw the portions 13d, 13b from the annular parts 10a, 3a. In the next step, the operator withdrawns the cutting member 10 from the cutting member 5 or withdraws the cutting members 5 and 10 in a simultaneous step. The machine is now ready for cleaning and the operator has full access to the rotary cutting member 4.

The housing H is formed with one or more outlets 3b (only one shown) which are outwardly adjacent to the annuli of teeth 5b, 10b when the cutting members 5, 10 are properly inserted into and retained in the housing. The funnel 13 admits material into the interior of the cutting members 5, 10 so that the material descends onto the top face of the rotary cutting member 4 and is forced to move radially outwardly and into the range of the teeth 4a. These teeth compel the material to pass between the teeth 5b, 10b and toward the outlet or outlets 3b.

The configuration of the bayonet slots 11 and the positioning of the bayonet pins 12 is preferably such that the funnel 13 cannot wobble when it is properly coupled to the housing H, and also that the clamping means 13a prevents any axial displacements of the stationary cutting members 5 and 10.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a machine for comminuting meat and similar materials, a housing having a transverse wall and a first annular wall extending from one side of said transverse wall; a drive shaft extending through said transverse wall; a rotary cutting member secured to said shaft in said housing; a stationary cutting member having a second annular wall received in said first annular wall, one of said annular walls having an axially extending groove adjacent to the other annular wall and the other annular wall having a projection extending into said groove to hold said second annular wall against rotation but to permit withdrawal of said stationary cutting member from said housing in the axial direction of said first annular wall.

2. A structure as set forth in claim 1, wherein said projection is provided on said first annular wall.

3. A structure as set forth in claim 1, wherein said shaft is vertical and wherein said transverse wall constitutes the bottom wall of said housing.

4. A structure as set forth in claim 1, wherein said housing is provided with at least one outlet which is outwardly adjacent to said stationary cutting member, said cutting members having concentric annuli of teeth between which the comminuted material passes from the interior of said stationary cutting member to said outlet in response to rotation of said shaft.

5. A structure as set forth in claim 1, wherein said first annular wall comprises a first annular portion extending beyond said second annular wall, and further comprising a funnel having a second annular portion received in said first annular portion, and at least one bayonet lock for detachably coupling said annular portions to each other.

6. A structure as set forth in claim 5, wherein said second annular wall and said second annular portion are provided with abutting end faces and wherein said second annular wall comprises an annular flange abutting against an internal shoulder of said first annular wall so that said stationary cutting member is held against axial movement when said funnel is coupled to said housing.

7. A structure as set forth in claim 1, wherein said rotary cutting member comprises a first annulus of teeth and said stationary cutting member comprises a second annulus of teeth surrounding said first annulus.

8. A structure as set forth in claim 7, wherein said first annular wall is provided with an internal shoulder and said second annular wall comprises an annular flange abutting against said shoulder when said stationary cutting member is fully received in said housing.

9. A structure as set forth in claim 7, wherein the teeth of said second annulus define between themselves a plurality of gaps, and further comprising a second stationary cutting member received in said first named stationary cutting member and having a third annulus of teeth received in the gaps between the teeth of said second annulus.

10. A structure as set forth in claim 9, wherein said stationary cutting members are provided with coplanar end faces distant from said transverse wall, and further comprising clamping means abutting against said end faces and detachably coupled to said housing.

11. A structure as set forth in claim 9, wherein said stationary cutting members are provided with end faces distant from said transverse wall and further comprising clamping means abutting against said end faces and detachably coupled to said housing, said first annular wall comprising a first annular portion extending beyond said stationary cutting members and said clamping means forming part of a funnel arranged to feed material into the interior of said stationary cutting members, said funnel having a second annular portion received in said first annular portion and one of said annular portions having at least one bayonet slot, the other annular portion having a bayonet pin extending into said slot to thereby maintain said second annular portion in abutment with said stationary cutting members.

12. A structure as set forth in claim 11, wherein the axial length of said stationary cutting members is the same.

References Cited

UNITED STATES PATENTS 3,044,514   7/1962   Schnell _____ 146—192

WILLIAM W. DYER, Jr., *Primary Examiner.*

W. GRAYDON ABERCROMBIE, *Examiner.*